United States Patent

[11] 3,633,699

| [72] | Inventors | Robert James Bishop;<br>Lee J. Wanie, both of Horicon, Wis. |
|---|---|---|
| [21] | Appl. No. | 15,327 |
| [22] | Filed | Mar. 2, 1970 |
| [45] | Patented | Jan. 11, 1972 |
| [73] | Assignee | Deere & Company<br>Moline, Ill. |

[54] CONTROL MEANS FOR TRACTOR-MOUNTED DRIVEN IMPLEMENT
20 Claims, 4 Drawing Figs.

[52] U.S. Cl. .................................................. 180/53 R,
56/11.8, 74/242.15 R, 180/70 R, 180/77 R, 192/11
[51] Int. Cl. ..................................................... B60k 17/28,
B60k 25/06, F16h 57/10
[50] Field of Search ............................................ 180/53 R,
70 R, 77 R, 19 R; 56/11.8; 192/11; 74/242.15 R

[56] References Cited
UNITED STATES PATENTS

| 3,319,731 | 5/1967 | Kenkel | 180/70 X |
|---|---|---|---|
| 3,339,662 | 9/1967 | Hanson et al. | 180/70 X |
| 3,477,439 | 11/1969 | Hamouz et al. | 180/70 |
| 3,483,763 | 12/1969 | Enters | 180/70 X |
| 3,539,040 | 11/1970 | Edwards | 192/11 X |

*Primary Examiner*—A. Harry Levy
*Attorneys*—H. Vincent Harsha, Harold M. Knoth, William A. Murray, John M. Nolan and Raymond L. Hollister ABSTRACT: A rotary mower is suspended beneath a vehicle chassis and is drivingly connected to a motor on a chassis by an endless belt and drive and driven sheaves. The belt is selectively tensioned and slackened by an idler sheave which is mounted on a crank arm. The crank arm is interconnected with a first pedal mounted on the chassis so that upon depression of the first pedal the idler sheave tensions the belt. A latch mounted on the chassis engages the first pedal to hold the same in its depressed position. A second pedal is mounted on the chassis and has a disengaging member connected thereto to disengage the latch when the second pedal is depressed.

INVENTORS
ROBERT J. BISHOP &
LEE J. WANIE

2

CONTROL MEANS FOR TRACTOR-MOUNTED DRIVEN IMPLEMENT

BACKGROUND OF THE INVENTION

This invention relates generally to a clutch control mechanism for a driven implement suspended beneath a driven vehicle, and more particularly relates to means for selectively establishing and disrupting the driving connection between an engine on a relatively small vehicle such as a lawn and garden tractor or riding mower and a driven implement tractively coupled to the vehicle.

In most lawn and garden tractors and riding mowers, the driving connection between the implement and engine is selectively established and disrupted by a movable clutch member whose movement is controlled through a suitable overcenter linkage. The overcenter linkage is necessary to maintain a driving connection without a continuous effort on the part of the operator. Since the overcenter linkage must positively be moved in both directions, it was not possible to operate the linkage with a pedal and a hand lever was required. In many instances, it is desirable to control the implement clutch by foot so that the number of operations performed by hand is kept at a minimum and the operator is free to use both hands to steer the vehicle.

SUMMARY OF THE INVENTION

The principal object of the present invention is to provide a pedal control system for a clutch member which selectively establishes and disrupts a driving connection between a vehicle and a driven implement tractively coupled thereto.

An additional object of the invention is to provide a control system for selectively establishing and disrupting a driving connection between an engine on a lawn and garden tractor and a driven implement connected to the tractor, which control system is operated by a pair of pedals, one pedal serving to establish a driving connection and the second pedal serving to disrupt the driving connection.

A more specific object of the present invention is to provide a riding mower having a chassis mounted on front and rear wheels, and the engine mounted on the chassis, a rotary mower suspended beneath the chassis, movable means for selectively establishing and disrupting a driving connection between the engine and rotary mower, a first pedal pivotally mounted on the chassis and connected with the movable means to establish the driving connection upon movement of the first pedal to an engaged position, latch means pivotally mounted on the chassis and engageable with the first pedal to retain the first pedal in its engaged position, and a second pedal pivotally mounted on the chassis and having a disengaging member connected thereto for disengaging the latch means upon movement of the second pedal to a disengaged position.

The above objects and additional objects and advantages of the present invention will become apparent along with the details of construction of a preferred embodiment of the invention of a reading of the following detailed description when taken in conjunction with the accompanying drawings.

DESCRIPTION OF THE PREFERRED EMBODIMENT

Figure 1:
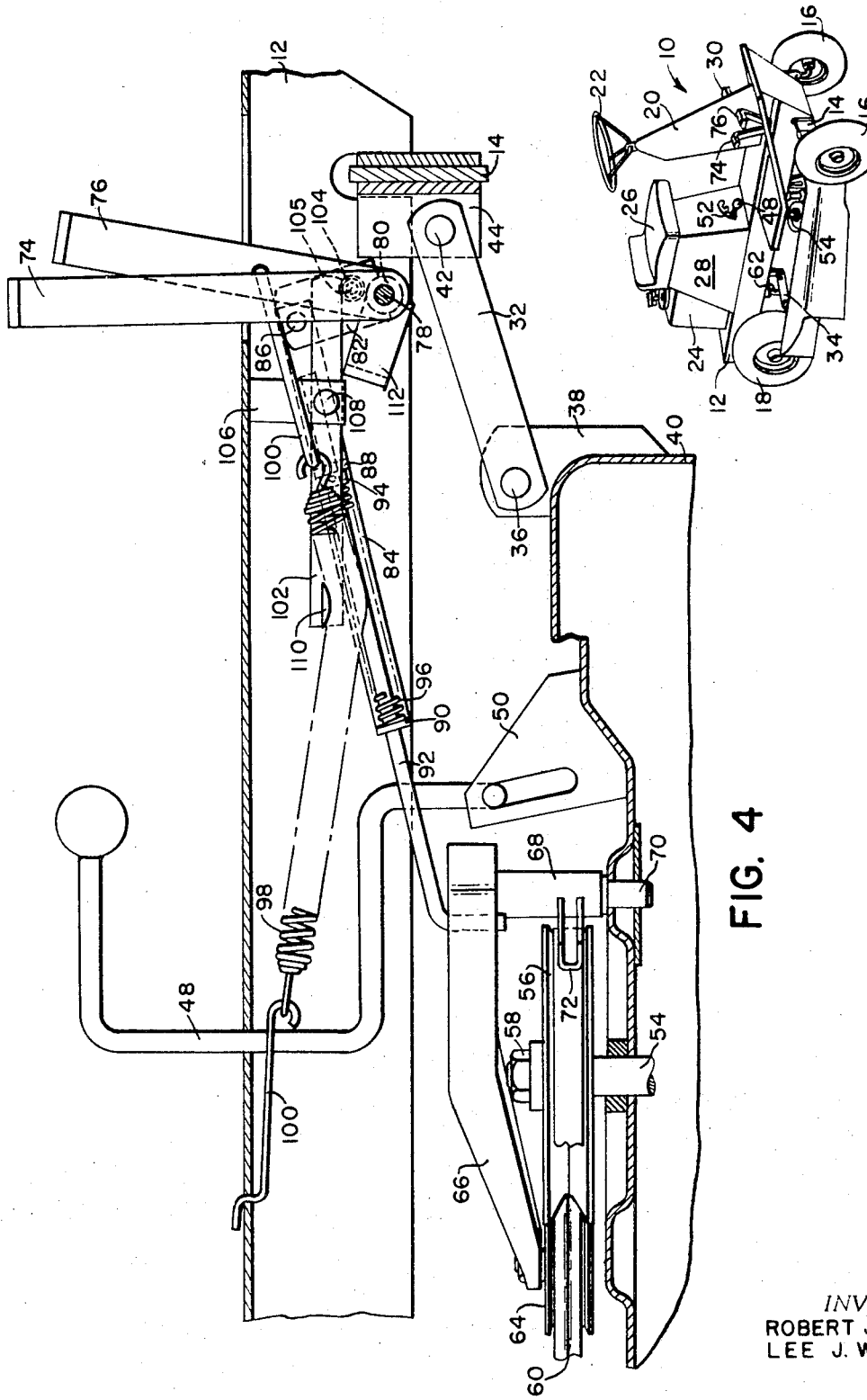
FIG. 1 is a perspective view of a riding mower embodying the clutch control mechanism according to the present invention.

Referring now to the drawings, a riding mower in which the principles of the present invention are incorporated is illustrated fully in FIG. 1 and indicated generally by the numeral 10. The riding mower includes a main frame or chassis 12 consisting of an inverted channel-shaped member having a horizontal bight portion and a pair of depending legs. The chassis 12 is mounted on a front axle 14 carried by a pair of steerable wheels 16 and a rear axle carried by driven wheels 18. A support member 20 mounted on the forward end of the chassis 12 carries a steering wheel 22 and encloses a conventional steering rod which interconnected the steering wheel 22 and the conventional steering linkage for the steerable front wheels 16. A motor 24 is mounted on the rear portion of the chassis 12 and is drivingly connected to the rear traction wheels 18 in any suitable manner. Immediately forward of the engine 24 an operator's seat 26 is mounted on a pedestal 28 carried by the chassis 12. Although not disclosed, the vehicle portion of the riding mower also includes a clutch for selectively establishing and disrupting the driving connection between the engine 24 and rear traction wheels 18 and a suitable brake for the wheels 18. The clutch and brake for the vehicle portion of the riding mower are controlled by a pedal 30 mounted on the left-hand side of the support member 20.

A mower unit is suspended beneath the chassis 12 intermediate the front and rear wheels 16 and 18 by front and rear pairs of parallel links 32 and 34 respectively. The front links 32 have their rear ends pivotally connected to a transversely extending rod 36 carried by a pair of upstanding ears 38 secured to the forward portion of the mower housing 40. The links 32 extend generally upwardly and forwardly and have their forward ends pivotally mounted on a pair of pins 42. Each pin 42 is carried by a pair of ears 44 on the opposite ends of a bracket 46 which extends across and is secured to the legs of the chassis 12. The rear links 34 suspend the rear portion of the mower housing in a similar manner. The mower housing 40 can be raised and lowered with respect to the chassis 12 by a height control lever 48. The lower end of the lever 48 is loosely connected to an ear 50 secured to the top surface of the mower housing 40. The lever 48 extends upwardly through a suitable opening in the chassis 12 and has a forwardly extending horizontal portion at its upper end which extends through a notched slot 52 provided in the front face of the pedestal 28. The slot 52 extends generally diagonally across the front face of the pedestal 28 so that the notches are provided at different heights. By hooking the forwardly extending portion of the control lever 48 in the various notches of the slot 52 the height of the mower can be varied. It should be noted that the manner in which the mower housing is suspended beneath the chassis and raised and lowered with respect to the chassis forms no part of the present invention and can be accomplished in any conventional manner. For example, the forward links 32 could be connected to the pivoted front axle 14 so that the mower unit more closely follows the contour of the ground.

The illustrated mower unit is of the type commonly referred to as a rotary cutter and has a blade (not shown) mounted on a shaft 54 for rotation in a generally horizontal plane. The shaft 54 is journaled in the top surface of the mower housing 40 and has a driven sheave 56 keyed to its upper end and retained thereon by a nut 58. An endless flexible belt 60 is trained about the sheave 56 and is also trained about a drive sheave on the drive shaft to the engine 24. In the illustrated riding mower, the engine 24 is of the type having a vertical crankshaft with the output end 62 of the crankshaft projecting below the chassis 12. Since the engine crankshaft extends below the chassis 12, there is no need for any type of jackshaft arrangement between the drive sheave on the engine crankshaft and the driven sheave 56 on the mower unit, and the belt 60 can be trained directly about the drive and driven sheaves without the use of intermediate mule sheaves.

The belt 60 is loosely trained about the drive sheave on the engine crankshaft and the driven sheave 56 and is selectively tensioned and slackened by an idler sheave 64 which functions as a clutch to selectively establish and disrupt a driving connection between the drive and driven sheaves. The idler sheave 64 is mounted on one end of a crank arm 66. The crank arm 66 is secured to the upper end of a sleeve 68 journaled on an upstanding pivot shaft 70 which is secured to the upper surface of the mower housing 40. A brake arm 72 is secured to the sleeve 68 and is adapted to engage the portion of the belt 60 trained about the driven sheave 56 when the idler sheave 64 is moved in a direction to slacken the belt 60. In this manner, the cutter blade of the mower unit is automatically braked when the driving connection between the drive and driven sheaves is disrupted by movement of the idler sheave 64 away from the belt 60.

According to the present invention, the movement of the idler sheave 64 to selectively establish and disrupt the driving connection between the drive and driven sheaves is controlled by a pair of pedals 74 and 76 which are pivotally mounted on the chassis 12 along the right-hand side of the support member 20. The pedal 74 is rigidly secured to a rockshaft 78 which extends between and is journaled in the legs of the chassis 12. The pedal 76 is rigidly secured to a sleeve 80 which is journaled on the rockshaft 78. As can be seen in the drawing, the pedals 74 and 76 are mounted in close relationship to each other and both have their upper ends bent outwardly to form foot-engaging portions. The pedal 74 extends slightly higher than the pedal 76 and its upper end is positioned rearwardly of the pedal 76, but the foot-engaging portion of the pedal 76 is longer than that of the pedal 74 so that it extends outwardly beyond the foot-engaging portion of the pedal 74. With the pedals so formed, the operator of the riding mower can operate the pedal 76 by engaging the outer end of the foot-engaging portion thereof even though the upper end of the pedal 74 is to the rear of the pedal 76.

Figure 2:
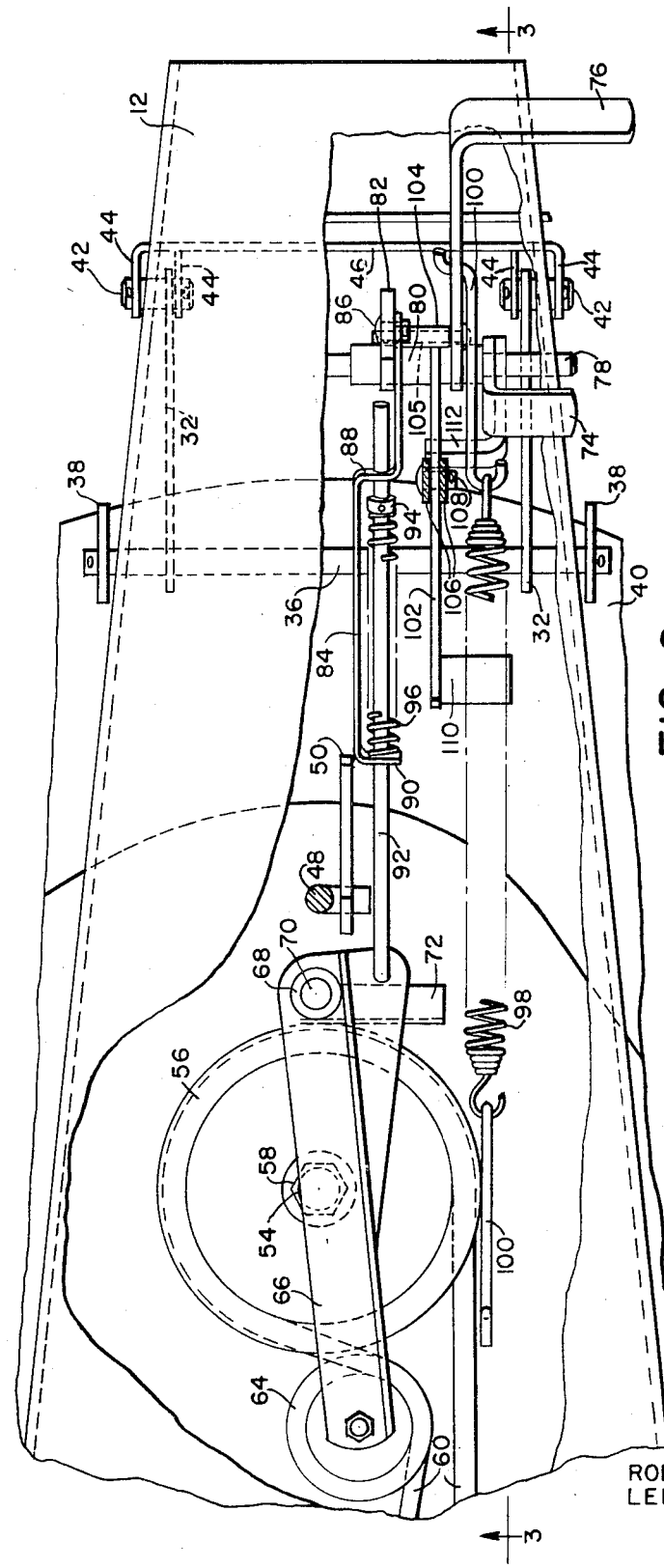
FIG. 2 is a fragmentary plan view of the mower illustrated in FIG. 1 with parts broken away to illustrate the mower drive control mechanism.
Figure 3:
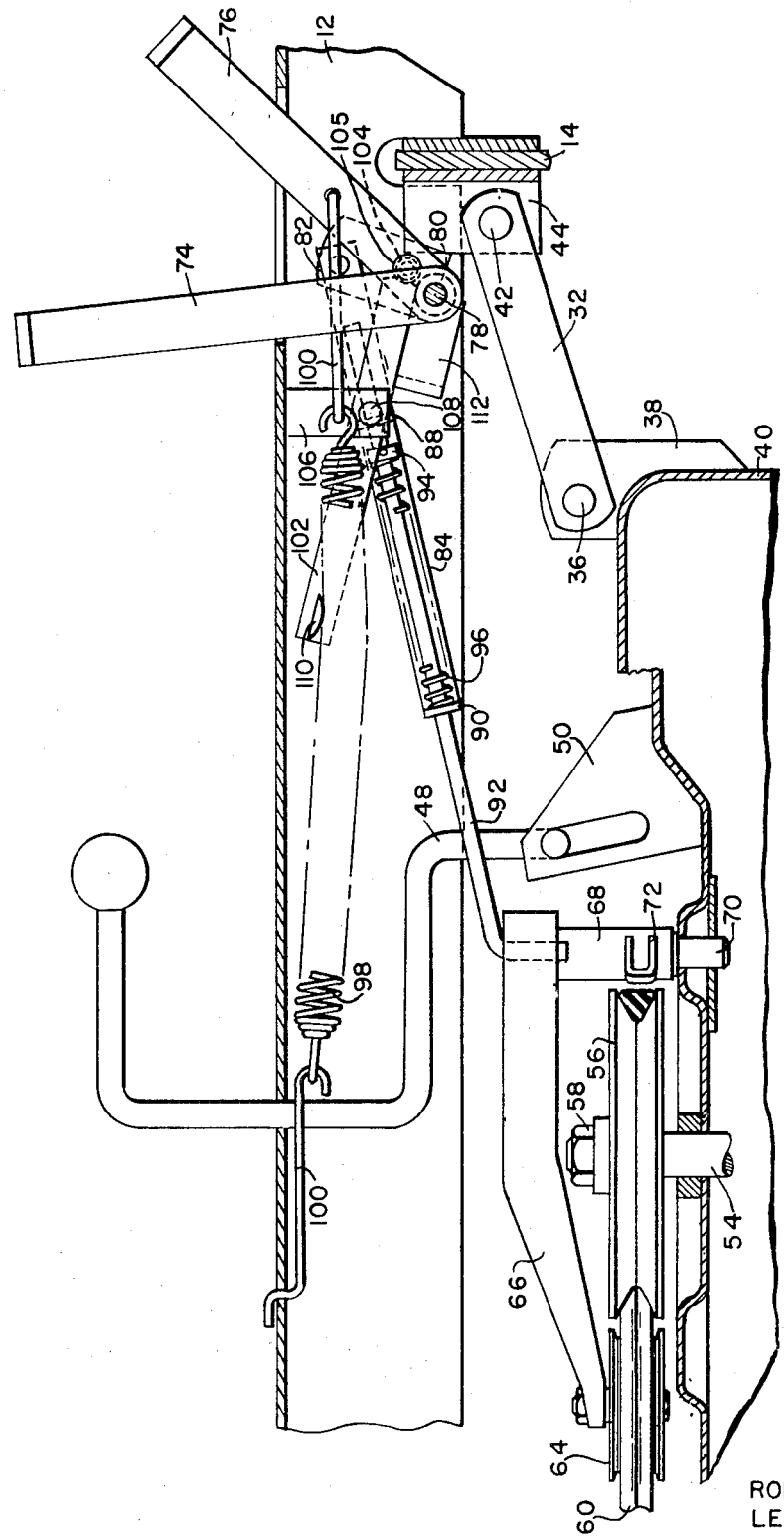
FIG. 3 is a sectional view taken substantially along the line 3—3 of FIG. 2, the parts being illustrated in their relative positions when the mower drive is connected; and, FIG. 4 is a view similar to FIG. 3 but illustrating the position of the parts when the mower drive is disconnected.

The pedal 76 is connected with the crank arm 66 in such a manner that when the pedal 76 is moved forwardly to the position illustrated in FIGS. 2 and 3, the idler sheave 64 is moved toward the belt 60 to tension the same and thereby establish the driving connection between the drive and driven sheaves, and when the pedal 76 is permitted to move rearwardly to the position illustrated in FIG. 4, the idler sheave 64 is moved away from the belt 60 and the brake arm 72 applied against the belt 60. To this end, a generally upwardly extending arm 82 is secured to the sleeve 80 and an elongated flat strap member 84 has one end pivotally connected to the free end of the arm 82 by a pivot pin 86. The strap member 84 has a pair of 90° bends intermediate its ends to form a laterally offset portion 88 and is also provided with a 90° bend at its free end to form a laterally offset portion 90. The offset portions 88 and 90 of the strap member 84 are apertured and a rod 92 extends through the apertured offset portions 88 and 90. The rod 92 has one end pivotally connected to the crank arm 66 at a position spaced from the pivot shaft 70 and its opposite end extends along the flat strap member 84. A stop member 94 is adjustably mounted on the rod 92 intermediate the offset portions of the flat strap member 84 and a compression spring 96 is mounted on the rod and acts between the stop member 94 and the offset end 90 of the strap 84.

The pedal 76 is biased toward the rearward disengaged position by a tension spring 98 which has its opposite ends secured to the pedal 76 and the chassis 12 by a pair of anchor members 100. When the pedal 76 is moved to the forward engaged position illustrated in FIG. 3, it is retained by a latch arm 102 and an abutment member or roller 104. The latch arm 102 is pivotally mounted intermediate its ends between a pair of ears 106 depending from the chassis 12 by a pivot pin 108. The rear end of the latch arm 102 is provided with a laterally extending projection 110 which is positioned over the spring 98 and deflects the spring 98 below the direct line between the anchor points for the spring 98. The spring 98 thus tends to rotate the latch arm 102 in a clockwise direction as viewed in FIGS. 3 and 4. The abutment member or roller 104 is journaled on a pin or shaft 105 which extends between and is secured to the pedal 76 and the sleeve 80 and therefore forms a part of and moves with the pedal 76. When the pedal 76 is in its rear disengaged position, the latch arm 102 extends over the roller 104 and when the pedal 76 is moved to its forward engaged position, the roller 104 will move forwardly permitting the spring 98 to rotate the latch arm 102 so that the forward end of the latch arm 102 will engage the roller 104 and prevent rearward movement of the pedal 76.

A release arm 112 for the latch arm 102 is secured to the shaft 78, extends generally rearwardly from the shaft 78 and has a laterally offset end portion which extends beneath the latch arm 102 forwardly of the pivot pin 108. When the rockshaft 78 is rotated in a clockwise direction by forward movement of the pedal 74, the release arm 112 lifts the forward end of the latch arm 102 to a position above the roller 104 so that the spring 98 can return the pedal 76 to its rear disengaged position. The roller 104 reduces the effort required to lift the forward end of the latch arm 102.

The operation of the controls for the idler sheave 64 is generally as follows: When the operator desires to engage the mower unit, he merely pushes forward on the pedal 76 until the forward end of the latch arm 102 is moved down into engagement with the roller 104. When the pedal 76 is moved forwardly, the flat strap member 84 is moved forwardly and pulls the rod 92 forwardly by acting through the spring 96 and stop member 94. Forward movement of the rod 92 rotates the crank arm 66 in a counterclockwise direction as viewed in FIG. 2 to tension the belt 60. When the belt 60 has been tensioned a sufficient amount to establish a driving connection between the drive sheave on the engine crankshaft and the driven sheave 56, the spring 96 will compress to permit the pedal 76 to be moved forwardly the distance needed for the roller 104 to move from under the latch arm 102 so that the forward end of the latch arm 102 can move downwardly to a position where it will engage the roller 104. The spring 96 will also permit vertical adjustment in the height of the mower unit without affecting the tension in the belt 60. When it is desired to disrupt the driving connection between the engine and mower unit, the operator merely pushes forwardly on the pedal 74 so that the release arm 112 lifts the latch arm 102 above the roller 104. The spring 98 then returns the pedal 76 to its rear disengaged position. As the pedal 76 moves to its rear disengaged position, the flat strap member 84 is moved rearwardly and the intermediate offset portion thereof will engage the stop 94 to move the rod 92 rearwardly and rotate the crank arm 66 in a clockwise direction as viewed in FIG. 2 to move the idler sheave 64 away from the belt 60 and to apply the brake arm 72 against the belt to thereby quickly stop the rotating blade.

It should be noted that while the invention has been described and illustrated with reference to a riding mower, the vehicle is only representative of the large number of small vehicles commonly referred to as lawn and garden tractors, and the mower unit is representative of the numerous driven implements which are used with lawn and garden tractors.

While only a single preferred embodiment of the invention has been described and illustrated, various modifications within the scope of the invention will become apparent to those skilled in the art and can be made without departing from the underlying principles of the invention.

We claim:

1. In combination with a tractor having a chassis mounted on front and rear wheels and an engine mounted on the chassis, a driven implement tractively coupled to the chassis, and clutch means movable between a first disengaged position and a second engaged position to selectively establish and disrupt a driving connection between the engine and driven implement, control means for the clutch means comprising: first and second pedal means mounted on the chassis for movement between first and second positions; means interconnecting the movable clutch means and the first pedal means to move the clutch means to its second position upon movement of the first pedal means to its second position to thereby establish the driving connection; latch means mounted on the chassis and engageable with the first pedal means when in its second position to normally hold the first pedal means in its second position; and means movable with the second pedal means and engageable with the latch means to disengage the latch means upon movement of the second pedal means to its second position.

2. The combination set forth in claim 1 wherein an abutment member is connected to the first pedal means for movement therewith, the latch means includes a latch arm pivotally mounted for movement between a first unlatched position and a second latched position in which it engages the abutment member, and spring means biases the latch means toward its second position and the first pedal means toward its first position.

3. The combination set forth in claim 2 wherein the spring means is a tension spring anchored between the chassis and first pedal means, the latch arm is pivotally mounted intermediate its ends and has one end engageable with the abutment member when the first pedal means and latch arm are in their second positions; and a lateral projection on the opposite end of the latch arm is positioned above the tension spring and below a direct line between the anchor points of the tension spring.

4. The combination set forth in claim 3 wherein the abutment member is a roller journaled on a shaft carried by the first pedal means.

5. A garden tractor comprising: a chassis mounted on front and rear wheels; an engine mounted on the chassis and having a drive sheave; means drivingly connecting the engine to the wheels; an implement coupled to the chassis to travel therewith and having a movable work-performing element; a rotatable driven sheave on the implement drivingly connected with the work-performing element; endless belt means loosely trained about the drive and driven sheaves; an idler sheave carried by a crank arm pivotally mounted on the implement for movement toward and away from the belt means to selectively tension and slacken the belt means to thereby drivingly connect and disconnect the drive and driven sheaves; first and second pedal means pivotally mounted on the chassis for movement between first and second positions; means interconnecting the crank arm and first pedal means to drivingly connect the drive and driven sheaves upon movement of the first pedal means to its second position; latch means movably carried by the chassis and engageable with the first pedal means when the first pedal means is moved to its second position to retain the first pedal means in its second position and maintain the driving connection between the drive and driven sheaves; and means movable with the second pedal means and engageable with the latch means to disengage the latch means upon movement of the second pedal means to its second position, whereby upon movement of the first pedal means to its second position the work-performing element of the implement is drivingly connected with the engine and upon movement of the second pedal means to its second position the work-performing element of the implement is disconnected from the engine.

6. The tractor set forth in claim 5 wherein a single resilient means biases the first pedal means toward its first position and the latch means toward engagement with the first pedal means.

7. The tractor set forth in claim 6 wherein an abutment member is carried by the first pedal means, and the latch means includes a latch arm pivotally mounted on the chassis for movement between a first position in which a first end overlies the abutment member when the first pedal means is in its first position and a second position in which the first end engages the abutment member when the first pedal means is in its second position.

8. The combination set forth in claim 7 wherein the abutment member is a roller journaled on a shaft carried by the first pedal means.

9. The tractor set forth in claim 7 wherein the resilient means is a tension spring having opposite ends anchored to the chassis and first pedal member, the latch arm is pivotally mounted intermediate its ends and the second end of the latch arm is provided with a lateral projection which is positioned over the tension spring and under the direct line between the anchor points of the spring.

10. The tractor set forth in claim 9 wherein the implement is suspended beneath the chassis and intermediate the front and rear wheels for vertical movement with respect to the chassis, and the means interconnecting the crank arm and first pedal means includes spring means which compensates for relative movement between the chassis and implement to maintain the belt means in tension whenever the first pedal means is in its second position.

11. The tractor set forth in claim 9 wherein the implement is suspended beneath the chassis for vertical movement with respect thereto, a brake member is secured to the crank arm for movement therewith to engage the portion of the belt means trained about the driven sheave when the belt means is slackened, and the means interconnecting the crank arm and first pedal means includes an arm connected to the first pedal means for movement therewith, an elongated flat strap member having one end pivotally connected to the arm and having an apertured laterally offset portion at its opposite end, the flat strap member further having an apertured laterally offset portion intermediate its ends, a rod member having one end pivotally connected with the crank arm and its opposite end extending through the apertured portions of the flat strap member, a stop member mounted on the rod member intermediate the apertured portions of the flat strap member, and compression spring means mounted on the rod member and acting between the stop member and apertured end portion of the flat strap member.

12. A riding mower comprising: a chassis mounted on front and rear wheels; an engine mounted on the chassis and having a drive sheave; a mower suspended beneath the chassis for movement therewith and having a driven sheave; an endless flexible belt loosely trained about the drive and driven sheaves; a crank arm pivotally mounted on the mower and having an idler sheave mounted thereon for movement toward and away from the belt to selectively tension and slacken the belt; first pedal means pivotally mounted on the chassis for movement between first and second positions; means including link means interconnecting the first pedal means and crank arm to tension the belt upon movement of the first pedal means from its first position to its second position; latch means carried by the chassis to normally hold the first pedal means in its second position; second pedal means pivotally mounted on the chassis for movement between first and second positions; and means movable with the second pedal means to disengage the latch means upon movement of the second pedal means from its first to its second position, whereby upon movement of the first pedal means to its second position the mower is drivingly connected to the engine and upon movement of the second pedal means to its second position the mower is disconnected from the engine.

13. The mower set forth in claim 12 wherein an abutment member is connected to the first pedal for movement therewith, the latch means includes an arm pivotally mounted on the chassis for movement between a first position in which a first end thereof overlies the abutment member and a second position in which the first end engages the abutment member, and resilient means biasing the latch arm toward its second position, whereby, as the first pedal means is moved to its second position, the abutment means is moved from under the first end of the latch arm and the latch arm is moved to its second position.

14. The combination set forth in claim 13 wherein the abutment member is a roller journaled on a shaft carried by the first pedal means.

15. The mower set forth in claim 13 wherein the resilient means is a tension spring anchored between the chassis and first pedal means, the latch arm is pivotally mounted intermediate its ends, the second end of the latch arm is provided with a lateral extension positioned over the tension spring and below the direct line of force between the anchor points of the tension spring whereby the resilient means biases the first pedal means toward its first position and the latch arm toward its second position.

16. The mower set forth in claim 15 wherein the means movable with the second pedal means includes a rock arm connected to the second pedal means, the rock arm having an offset end portion engageable with the latch arm to move the latch arm to its first position upon movement of the second pedal means to its second position.

17. The mower set forth in claim 16 wherein a rockshaft is journaled on the chassis, the second pedal means and rock arm are secured to the rockshaft, a sleeve is journaled on the rockshaft, and the first pedal means is fixed to the sleeve.

18. The mower set forth in claim 15 wherein the mower is suspended beneath the chassis for vertical movement with respect thereto, and the means interconnecting the first pedal means and the crank arm includes spring means which compensates for relative movement between the chassis and frame to maintain the tension in the belt whenever the first pedal means is in its second position.

19. The mower set forth in claim 18 wherein the means interconnecting the first pedal means with the crank arm further includes an arm connected to the first pedal means for movement therewith, an elongated flat strap member having one end pivotally connected to the arm and having an apertured inturned portion at its opposite end, and a rod member having one end pivotally connected with the crank arm and its opposite end extending through the apertured portion of the flat strap member, a stop member mounted on the extending end of the rod member, and the spring means is a compression spring mounted on the rod member and acting between the stop member and the inturned portion of the flat strap member.

20. The mower set forth in claim 19 wherein the elongated flat strap member has an apertured offset portion intermediate its ends, the rod member extends through the offset portion of the strap member, the spring and stop members are mounted on the rod member intermediate the inturned and offset portions of the strap member, and a brake member is secured to the crank arm for movement therewith to engage the portion of the belt trained about the driven pulley when the belt is slackened, whereby the brake member immediately stops the mower when the mower is disconnected from the engine.

* * * * *